Aug. 8, 1933.  D. W. SMITH  1,921,268
DOUGH ROLLING MACHINE
Filed Dec. 21, 1931  2 Sheets-Sheet 1

Witness
Arthur M. Franke.

Inventor
Dennis W. Smith
Rummler, Rummler
& Woodworth Attys.

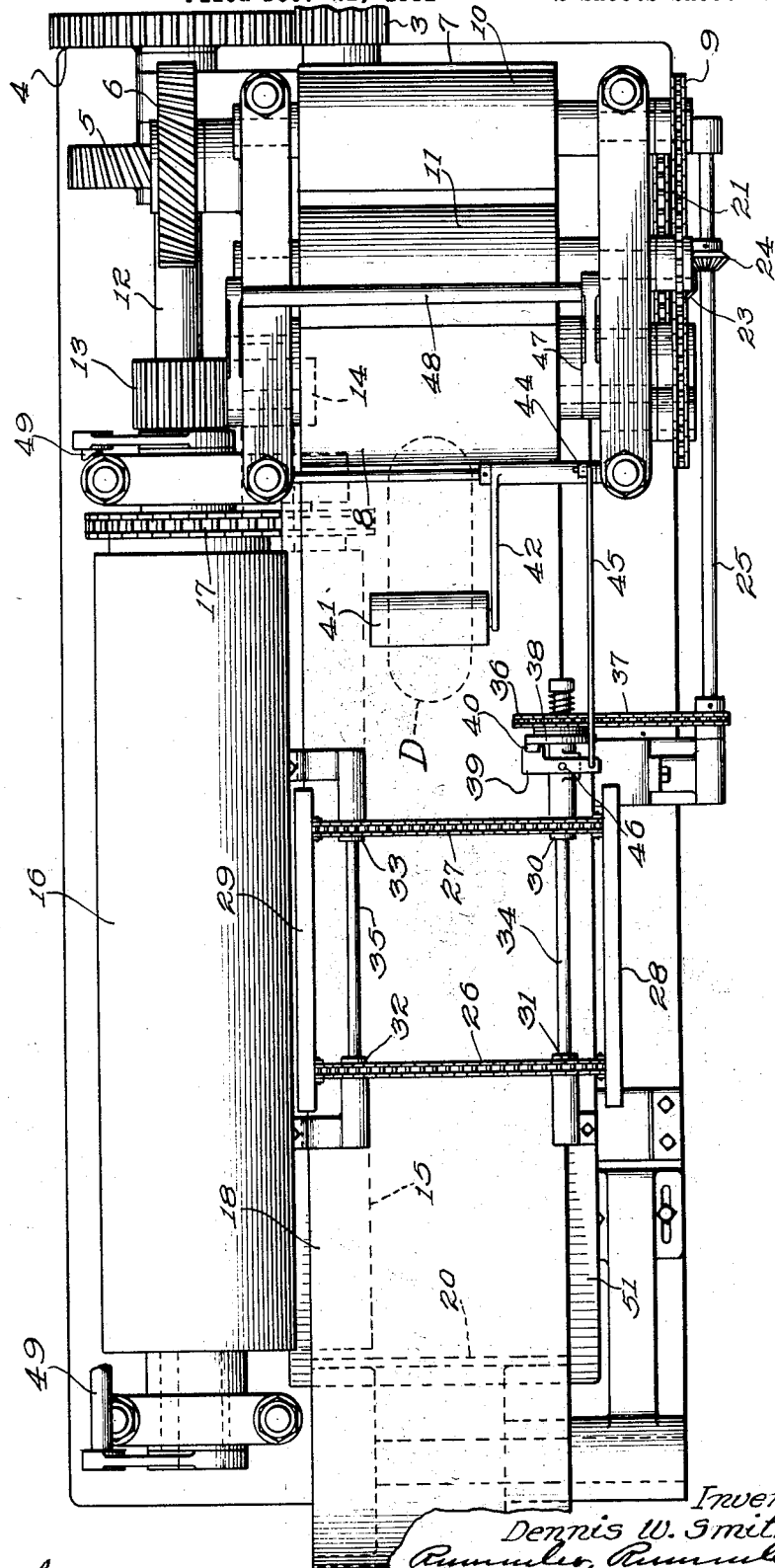

Patented Aug. 8, 1933

1,921,268

UNITED STATES PATENT OFFICE 1,921,268

DOUGH ROLLING MACHINE

Dennis W. Smith, Chicago, Ill., assignor to Colborne Manufacturing Co., Chicago, Ill., a Corporation of Illinois Application December 21, 1931. Serial No. 582,302

3 Claims. (Cl. 107—12)

This invention relates to dough rolling machines of the type described in the patent to O. Colborne and F. Deuerling No. 821,860 of May 29, 1906, and in the application for patent of Dennis W. Smith, Serial No. 496,201, filed November 17, 1930.

The object of the present invention is to improve such machines, particularly with reference to shifting a partly formed pie crust from one pair of rollers to another pair of rollers, including automatically timed mechanism for feeding the partly formed crust to the second pair of rollers, according to the delivery, at varying time intervals, of dough from the rollers which first act upon it.

The object is accomplished by a construction as illustrated in the drawings in which:—

Fig. 2 is a plan view of the machine.

Figure 1:
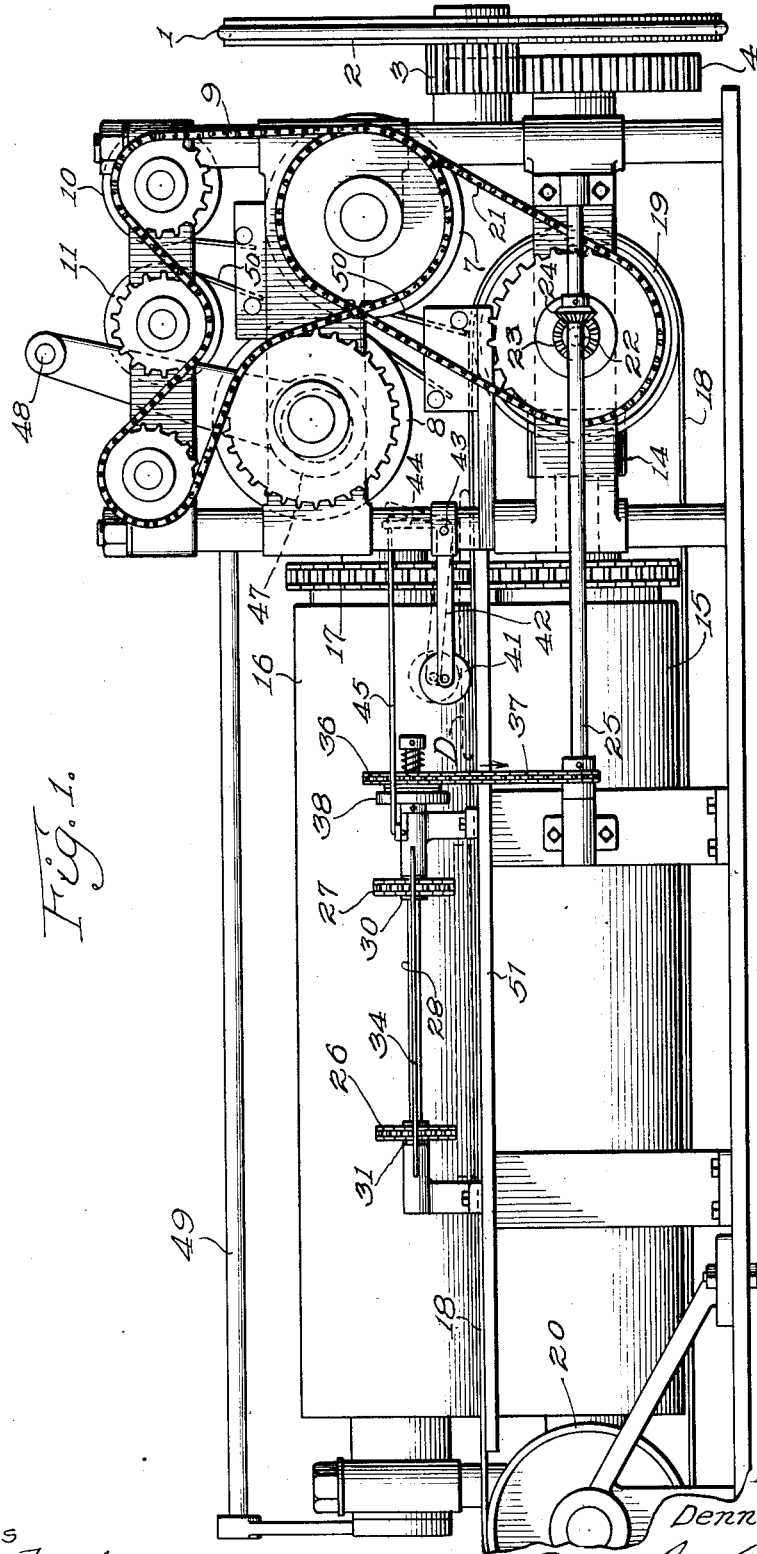
Fig. 1 shows the improved machine in front elevation.

In general this machine includes a plurality of pairs of rollers for successively acting upon portions of dough which are fed thereto, one at a time, by suitable conveyor mechanism, not shown. Three pairs of rollers are used; the first pair for roughly shaping the portions of dough preliminary to being acted upon by the second pair of rollers; the function of the second pair of rollers is to flatten the portions of dough into elliptical form; and the function of the third pair of rollers is to roll the elliptically formed portions of dough into substantially circular form, ready to be placed on pie plates. Between the second and third pairs of rollers is a means for conveying the dough from one pair of rollers to another including automatically timed feeding mechanism to which the present improvements particularly relate.

Power is applied to the machine through the belt 1 acting on pulley 2 which, through the gears 3 to 6, drives roller 7 of the pair of coacting rollers 7 and 8. Roller 8 is driven by a chain 9 passing over sprockets carried by these rollers. This chain also engages sprockets on a pair of rollers 10 and 11. The function of the pair of rollers 10 and 11 is to receive measured portions of dough from the conveyor and roll such portions into a uniform shape for reception by the lower rollers 7 and 8. The function of the latter pair of rollers is to roll the portions of dough into elliptical forms, as indicated by D.

The shaft 12 which carries gear 5 also carries a gear 13 meshing with a gear 14 carried by the shaft of a roller 15. The latter with a companion roller 16 has the function of rolling the elliptical portions of dough into circular sheets or pie crusts, ready for placement upon pie plates. Roller 16 is driven from the roller 15 by chain 17.

A conveyor belt 18, passing around the pulleys 19 and 20, receives the elliptical portions of dough from the rollers 7 and 8 and carries such elliptical portions into position for being fed to the rollers 15 and 16. Pulley 19 is driven by a chain and sprocket connection 21 with the roller 7.

Shaft 22 of pulley 19 carries a beveled pinion 23 meshing with a pinion 24 on a shaft 25 which is used for driving an intermittently operated pushing means for removing elliptical portions of dough carried by belt 18 transversely across this belt to the final forming rollers 15 and 16. This pusher means includes a pair of chains 26 and 27 carrying blades 28 and 29 arranged for traveling transversely over the belt. Chains 26 and 27 are carried by sprockets 30 to 33 fast to shafts 34 and 35. The shaft 34 supports loosely thereon a sprocket 36 which is driven by a chain 37 connecting it with a sprocket on shaft 25. The sprocket 36 may drive the shaft 34 through frictional engagement with disk 38 fast on shaft 34.

The driving of this shaft is normally prevented by a pawl 39 engaging a pin 40 on disk 38, and a trip device actuated by portions of dough traveling along belt 18 withdraws the pawl 39 from pin 40 at the proper time to cause one of the blades 29 to meet the elliptically formed portion of dough when it arrives in position to be engaged by the blade.

The dough actuated tripping means for controlling the intermittently operated pusher mechanism consists of a roller 41 carried by an arm 42 pivoted to the machine frame at 43. This roller idly rides on the surface of the belt 18 but when engaged by the partly rolled pie crusts carried by the belt, the roller moves upwardly and a vertically extending arm 44 thereof draws a rod 45 to the right, Figure 1. The left end of rod 45 is attached to pawl 39. Thus the pawl is rocked on its pivot 46 out of engagement with pin 40, permitting the shaft 34 to be frictionally rotated until the pawl is returned to its stopping position by roller 41 dropping off the rear edge of the portion of dough which lifted the roller.

When the shaft 34 is rotated, one of the blades 28 or 29, carried by the chains 26 and 27, sweeps laterally over the belt 18 in time to meet the oncoming elliptical portion of dough and push it sidewise to the rollers 15 and 16.

These rollers roll the dough at right angles to the direction in which it was rolled by the rollers 7 and 8, reducing the thickness of the dough and changing its form from elliptical to circular.

The conveyor belt 18 is prevented from sagging by the fixed plate 51, carried by the frame of the machine.

It is customary in machines of this class to support one of each of the pairs of rollers in eccentric bearings, as indicated by 47 on Figure 1. These eccentrics may be turned within their journals by the handle bars 48 or 49, thus regulating the distance between the rollers. It is also customary to employ the scrapers 50 for preventing dough from attaching to the rollers.

In the operation of the dough rollers, all of the rollers and the conveyor belt 18 are continuously driven, while the intermittently actuated structure for removing the dough, when in elliptical form, to rollers 15 and 16 is only actuated when the advancing edge of the dough engages roller 41 and rocks it upwardly.

The upward motion of the roller is utilized to trip pawl 39 and permit the friction drive between the sprocket 36 and shaft 34 to become effective. The stop pin 40 on friction disk 38 is located with reference to the blades 28 and 29 and the rate at which shaft 34 is driven, so that one of the blades will engage the edge of the dough on belt 18 at the proper time to accurately sweep it off the belt without imparting a turning motion thereto. Friction between the belt and dough is greatly reduced because the belt is covered with flour.

Although but one specific embodiment of this invention has been herein shown and described, it will be understood that certain details of the construction shown may be altered or omitted without departing from the spirit of this invention as defined by the following claims.

I claim:—

1. In a dough rolling machine a pair of rollers having the function of rolling portions of dough into elliptical form, a second pair of rollers having the function of rolling the elliptically formed portion of dough into circular form, a conveyor for receiving the elliptically formed portions of dough from said first-mentioned rollers, means for pushing the elliptically formed portions of dough laterally from the conveyor to the second pair of rollers, an intermittently operated driving mechanism for said pushing means, and a trip device for controlling said intermittently operated driving mechanism, said trip device including means engaged by dough on the conveyor for controlling its operation.

2. A dough rolling machine comprising a frame structure, a plurality of pairs of rollers journaled in said frame structure on horizontal axes, a conveyor belt arranged to receive partly formed pie crusts delivered thereto by one pair of rollers, means for sliding the partly formed pie crusts transversely along said belt consisting of parallel driven chains carrying a blade for sweeping laterally over the belt, a drive for said chains arranged to be intermittently driven, and means actuated by dough traveling along the belt for rendering said driving means effective or ineffective.

3. A dough rolling machine comprising a belt conveyor, a pair of rollers extending transversely of the conveyor and arranged to roll portions of dough received by the rollers, and deposit such portions of dough on the conveyor, a pair of rollers at the side of the conveyor and extending lengthwise thereof, means for continuously driving said two pairs of rollers and the conveyor, a pusher mechanism for removing dough from the conveyor laterally thereof to the second pair of rollers, means for intermittently operating said pusher mechanism, and a device for controlling said means for intermittently operating the pusher mechanism, said device being actuated by engagement therewith of dough traveling along said belt conveyor.

DENNIS W. SMITH.